United States Patent
Lu et al.

(10) Patent No.: US 10,685,649 B2
(45) Date of Patent: Jun. 16, 2020

(54) METHOD AND APPARATUS FOR PROVIDING VOICE SERVICE

(71) Applicant: BAIDU ONLINE NETWORK TECHNOLOGY (BEIJING) CO., LTD., Beijing (CN)

(72) Inventors: Guang Lu, Beijing (CN); Xiajun Luo, Beijing (CN); Shiquan Ye, Beijing (CN); Jue Huang, Beijing (CN); Miaochang Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 182 days.

(21) Appl. No.: 15/858,428

(22) Filed: Dec. 29, 2017

(65) Prior Publication Data

US 2019/0147862 A1    May 16, 2019

(30) Foreign Application Priority Data

Nov. 16, 2017   (CN) .......................... 2017 1 1136981

(51) Int. Cl.
*G10L 15/22* (2006.01)
*G06F 3/16* (2006.01)
*G10L 15/30* (2013.01)
*G06N 20/00* (2019.01)
*G06F 16/951* (2019.01)

(Continued)

(52) U.S. Cl.
CPC .............. *G10L 15/22* (2013.01); *G06F 3/167* (2013.01); *G06F 16/903* (2019.01); *G06F 16/9032* (2019.01); *G06F 16/951* (2019.01); *G06N 20/00* (2019.01); *G10L 15/30* (2013.01); *G10L 15/1815* (2013.01); *G10L 2015/088* (2013.01);

(Continued)

(58) Field of Classification Search
CPC ..... G10L 15/22; G10L 15/00; G10L 15/0204; G10L 15/18; G10L 15/1822; G10L 15/20; G10L 15/26
USPC ....... 704/251, 250, 254, 257, 233, 235, 270, 704/270.1, 275
See application file for complete search history.

(56) References Cited

U.S. PATENT DOCUMENTS 9,986,095 B1 * 5/2018 McCobb ............. H04M 3/5191
2003/0216960 A1 * 11/2003 Postrel ................... G06Q 30/02
705/14.26

(Continued)

FOREIGN PATENT DOCUMENTS

JP          2012123492 A     6/2012

*Primary Examiner* — Qi Han
(74) *Attorney, Agent, or Firm* — Lathrop GPM LLP (57) ABSTRACT

Embodiments of this disclosure disclose a method and apparatus for providing a voice service. An embodiment of the method comprises: analyzing, in response to receiving first voice request information sent by an intelligent voice device containing a display, the first voice request information to determine a user demand; determining an alternative operation associated with the user demand based on a configured optional operation set; generating prompt information for guiding a user to execute the alternative operation; and pushing the prompt information to the intelligent voice device containing the display to enable the intelligent voice device to show the prompt information on the display. The embodiment realizes a user demand based differential operation prompt, and improves the efficiency of the voice service.

13 Claims, 6 Drawing Sheets

(51) Int. Cl.
*G06F 16/9032* (2019.01)
*G06F 16/903* (2019.01)
*G10L 15/18* (2013.01)
*G10L 15/08* (2006.01)

(52) U.S. Cl.
CPC .. *G10L 2015/223* (2013.01); *G10L 2015/228* (2013.01)

(56) References Cited

U.S. PATENT DOCUMENTS

| | | | | |
|---|---|---|---|---|
| 2012/0311723 | A1* | 12/2012 | Britt, Jr. | G06Q 30/06 726/28 |
| 2015/0207766 | A1* | 7/2015 | Lindner | H04L 51/06 709/206 |
| 2017/0256260 | A1* | 9/2017 | Jeong | G06F 3/16 |

\* cited by examiner

METHOD AND APPARATUS FOR PROVIDING VOICE SERVICE

CROSS-REFERENCE TO RELATED APPLICATIONS

This application is related to and claims priority from Chinese Patent Application No. 201711136981.2, filed with the State Intellectual Property Office (SIPO) of the People's Republic of China on Nov. 16, 2017, the entire disclosure of the Chinese application is hereby incorporated by reference.

TECHNICAL FIELD

This disclosure relates to the field of computer technology, specifically to the field of artificial intelligence technology, and more specifically to a method and apparatus for providing a voice service.

BACKGROUND

With the development of computer technology and the unceasing accumulation of network data, artificial intelligence technology has developed very rapidly. In the field of artificial intelligence, the intelligent voice service integrating voice identification, natural language processing and machine learning technology is increasingly more widely used.

In voice interaction based on an intelligent voice service, a user may execute operations, such as multimedia resource playing and information inquiry. Upon receiving a voice request, an existing intelligent voice service platform may initiate relevant functions, and provide established operation interfaces, for example, when playing music, interfaces for operations, such as "play the next," "pause," "continue to play" and "add to favourites" are provided. For all users using the intelligent voice device, same operation interfaces are provided for the same type of voice service. However, implicit demands may be different when users send different voice requests requesting for the same type of voice services. When the users want to execute other operations without configured interfaces in the playing interface, the user needs to spend time on multilevel lookup in the application interface.

SUMMARY

An embodiment of this disclosure provides a method and apparatus for providing a voice service.

In a first aspect, an embodiment of this disclosure provides a method for providing a voice service, including: analyzing, in response to receiving first voice request information sent by an intelligent voice device containing a display, the first voice request information to determine a user demand; determining an alternative operation associated with the user demand based on a configured optional operation set; generating prompt information for guiding a user to execute the alternative operation; and pushing the prompt information to the intelligent voice device containing the display to enable the intelligent voice device to show the prompt information on the display.

In some embodiments, the analyzing the first voice request information to determine a user demand includes: ascertaining whether the first voice request information contains a keyword requesting for playing a multimedia resource; and if yes, identifying a preset multimedia tag in the first voice request information, and determining the user demand being a demand for playing a first multimedia resource containing the preset multimedia tag. The determining an alternative operation associated with the user demand based on a configured optional operation set includes: selecting a playing operation corresponding to the user demand and an optional operation associated with the playing operation from the configured optional operation set as the alternative operation; the optional operation associated with the playing operation including at least one of the following operations: an operation of selecting a to-be-played multimedia resource, an operation of switching a play mode, and an operation of feeding back preferences for a played multimedia resource.

In some embodiments, the analyzing the first voice request information to determine a user demand further includes: obtaining user descriptor data, scenario data and to-be-recommended multimedia resource data in response to determining the first voice request information containing a keyword requesting for playing the multimedia resource and the first voice request information not containing a preset multimedia tag; and determining the user demand being a demand for selecting a second multimedia resource matching the user descriptor data and/or the scenario data from the to-be-recommended multimedia resource data. The determining an alternative operation associated with the user demand based on a configured optional operation set includes: selecting a recommending operation corresponding to the user demand from the configured optional operation set as the alternative operation, where a recommended object of the recommending operation includes the second multimedia resource.

In some embodiments, the analyzing the first voice request information to determine a user demand further includes: searching, in response to determining the first voice request information not containing a keyword requesting for playing a multimedia resource, network data using a result of the analyzing the first voice request information as a search expression, and determining the user demand based on a result of the searching. The determining an alternative operation associated with the user demand based on a configured optional operation set includes: selecting an optional operation matching the result of the searching from the configured optional operation set as the alternative operation.

In some embodiments, the analyzing the first voice request information to determine a user demand includes: obtaining second voice request information being received in a preset period before receiving the first voice request information; and analyzing the first voice request information based on the second voice request information to determine the user demand.

In some embodiments, the method further comprises: monitoring user behavior data of executing the alternative operation based on the prompt information; and adjusting a parameter of a correlation between the alternative operation in the configured optional operation set and the user demand based on the behavior data.

In a second aspect, an embodiment of this disclosure provides an apparatus for providing a voice service, including: an analysis unit, for analyzing, in response to receiving first voice request information sent by an intelligent voice device containing a display, the first voice request information to determine a user demand; a determination unit, for determining an alternative operation associated with the user demand based on a configured optional operation set; a generation unit, for generating prompt information for guiding a user to execute the alternative operation; and a push unit, for pushing the prompt information to the intelligent voice device containing the display to enable the intelligent voice device to show the prompt information on the display.

In some embodiments, the analysis unit is further used for analyzing the first voice request information to determine a user demand as follows: ascertaining whether the first voice request information contains a keyword requesting for playing a multimedia resource; and if yes, identifying a preset multimedia tag in the first voice request information, and determining the user demand being a demand for playing a first multimedia resource containing the preset multimedia tag. The determination unit is further used for determining an alternative operation associated with the user demand as follows: selecting a playing operation corresponding to the user demand and an optional operation associated with the playing operation from the configured optional operation set as the alternative operation; the optional operation associated with the playing operation including at least one of the following operations: an operation of selecting a to-be-played multimedia resource, an operation of switching a play mode, and an operation of feeding back preferences for a played multimedia resource.

In some embodiments, the analysis unit is further used for analyzing the first voice request information to determine a user demand as follows: obtaining user descriptor data, scenario data and to-be-recommended multimedia resource data in response to determining the first voice request information containing a keyword requesting for playing the multimedia resource and the first voice request information not containing a preset multimedia tag; and determining the user demand being a demand for selecting a second multimedia resource matching the user descriptor data and/or the scenario data from the to-be-recommended multimedia resource data. The determination unit is further used for determining an alternative operation associated with the user demand as follows: selecting a recommending operation corresponding to the user demand from a configured optional operation set as the alternative operation, where a recommended object of the recommending operation includes the second multimedia resource.

In some embodiments, the analysis unit is further used for analyzing the first voice request information to determine a user demand as follows: searching, in response to determining the first voice request information not containing a keyword requesting for playing a multimedia resource, network data using a result of the analyzing the first voice request information as a search expression, and determining the user demand based on a result of the searching. The determination unit is further used for determining an alternative operation associated with the user demand as follows: selecting an optional operation matching the result of the searching from a configured optional operation set as the alternative operation.

In some embodiments, the analysis unit is further used for analyzing the first voice request information to determine a user demand as follows: obtaining second voice request information being received in a preset period before receiving the first voice request information; and analyzing the first voice request information based on the second voice request information to determine the user demand.

In some embodiments, the apparatus further includes a feedback unit for: monitoring user behavior data of executing an alternative operation based on prompt information; and adjusting a parameter of a correlation between the alternative operation in a configured optional operation set and a user demand based on the behavior data.

The method and apparatus for providing a voice service according to the embodiments of this disclosure analyze, in response to receiving first voice request information sent by an intelligent voice device containing a display, the first voice request information to determine a user demand; determine an alternative operation associated with the user demand based on a configured optional operation set; generate prompt information for guiding a user to execute the alternative operation; and push the prompt information to the intelligent voice device containing the display to enable the intelligent voice device to show the prompt information on the display, thereby realizing a user demand based differential operation prompt, providing different operation prompt information for different potential user demands, improving the speed of obtaining relevant operation information by a user, and contributing to improving the efficiency of the voice service.

BRIEF DESCRIPTION OF THE DRAWINGS

By reading and referring to the detailed description of non-limiting embodiments provided in the accompanying drawings, other characteristics, objects and advantages of the disclosure will become clearer.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
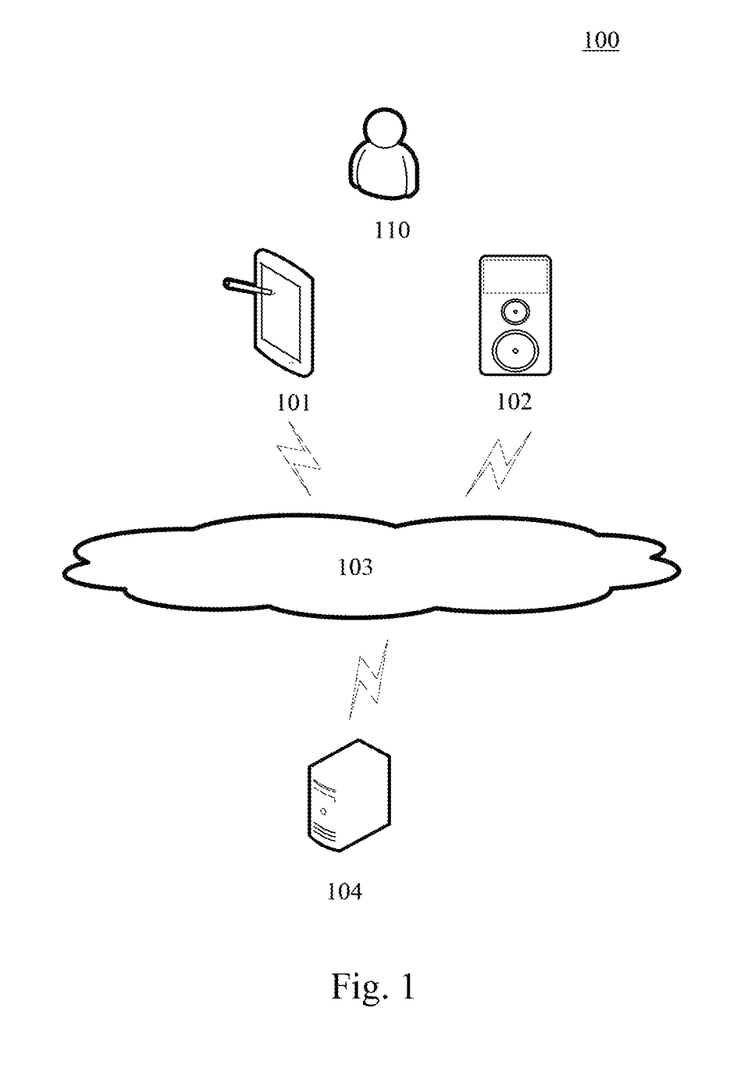
FIG. 1 is an architectural diagram of an illustrative system in which the present application may be implemented.

FIG. 1 shows an illustrative architecture of a system 100 which may be used by a method for providing a voice service or an apparatus for providing a voice service according to the embodiments of the present application.

As shown in FIG. 1, the system architecture 100 may include terminal devices 101 and 102, a network 103 and a server 104. The network 103 serves as a medium providing a communication link between the terminal devices 101 and 102 and the server 104. The network 103 may include various types of connections, such as wired or wireless transmission links, or optical fibers.

The user 110 may use the terminal devices 101 and 102 to interact with the server 104 through the network 103, in order to transmit or receive messages, etc. The terminal devices 101 and 102 may be an electronic device containing an audio input interface, an audio output interface and a display, and supporting network communications, such as smart loudspeaker boxes having a microphone and a display, smart phones, tablet computers, laptop computers, and smart wearable devices. An application capable of interacting with the server 104, such as a voice service client, may be installed on the terminal device 101 or 102.

The server 104 may be a server providing various services, such as a voice server that controls a voice output operation executed by the terminal devices 101 and 102. After the terminal devices 101 and 102 are connected to a voice server (for example, getting permission), the voice server may process a voice service request sent by the user 110 through the terminal devices 101 and 102, and send the results of the processing (such as audio data and control instructions of the audio output interface) to the terminal devices 101 and 102. The terminal devices 101 and 102 may receive audio data and control instructions sent by the server 104 through the network 103, and execute the corresponding voice output operation and display operation, thereby realizing completion of the voice service using the terminal devices 101 and 102.

It should be noted that the method for providing a voice service according to the embodiments of the present application is generally executed by the server 105. Accordingly, an apparatus for providing a voice service is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
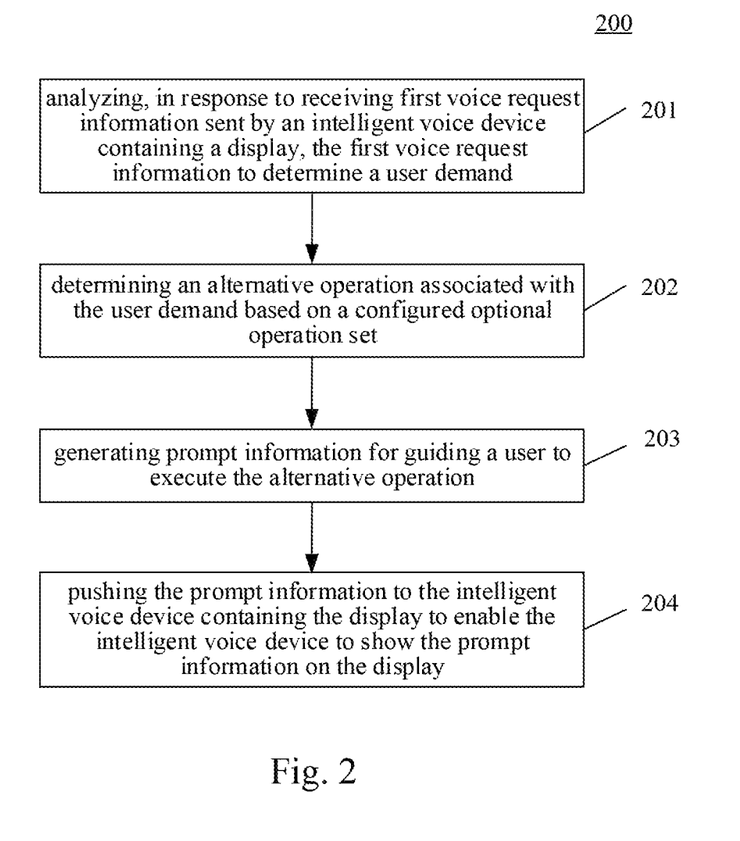
FIG. 2 is a schematic flowchart of a method for providing a voice service according to an embodiment of the present application.

Further referring to FIG. 2, a process 200 of an embodiment of a method for providing a voice service according to this disclosure is shown. The method for providing a voice service includes the following steps:

Step 201, analyzing, in response to receiving first voice request information sent by an intelligent voice device containing a display, the first voice request information to determine a user demand.

In this embodiment, an electronic device (e.g., the server shown in FIG. 1) on which a method for providing a voice service runs may detect a first voice request sent by an intelligent voice device. The intelligent voice device is an intelligent voice device containing a display (also known as a "screen end"). The intelligent voice device has an audio input interface and an audio output interface, and may obtain a voice request sent by a user through the audio input interface, generate first voice request information by coding and encapsulation, and send the first voice request information to the electronic device on which the method for providing a voice service runs.

After receipt of first voice request information sent by an intelligent voice device containing a display is detected, the first voice request may be analyzed to extract user demand information therefrom. Specifically, the first voice request information may be firstly decoded to obtain the voice request content, and then semantic analysis of the voice request content may be implemented by firstly lexing using a language model, then extracting core words and keywords, and finally determining the user demand included in the voice request content using a topic model.

In some optional modes of implementing this embodiment, a keyword set may be set for each function of the intelligent voice device. If a keyword or a keyword combination of a certain function is analyzed from the content of a first voice request, then a user demand corresponding to the first voice request may be determined to be a demand that can be satisfied by the function. For example, an alarm clock function may contain a keyword of "alarm clock," and an information pushing function may include keywords of: "broadcast and news," "weather," etc. When content obtained by analyzing the first voice request information contains a keyword of "broadcast news," the user demand may be determined to be a demand for obtaining pushed news.

In some optional modes of implementing this embodiment, first voice request information may be analyzed using a machine learning method, and specifically a user intention may be identified using a trained intention identification model, where a training sample of the intention identification model may be an artificially tagged sample. Parameters of the intention identification model are constantly adjusted in the training process to enable its predicted value to approach a tagged value, an adjustment of the model parameters is stopped when an error between the predicted values and the tagged value satisfies a convergence condition, and then a trained intention identification model is obtained. In application, voice request content of the first voice request information may be inputted into the intention identification model, which may output a user intention, and then a result of analyzing a user demand is obtained.

Step 202, determining an alternative operation associated with the user demand based on a configured optional operation set.

After determining the user demand, an optional operation satisfying the user demand may be selected from the configured optional operation set as the alternative operation. Here, the configured optional operation set may include a plurality of optional operations, and a user demand associated with each optional operation is configured. The configured optional operation set may be pre-configured as a matter of experience, where the user demand associated with the each optional operation may be a user demand associated with the voice interaction. Different user demands may be associated with different optional operations.

Usually, an intelligent voice device is designed based on a specific application scenario, such as a vehicle-mounted information device, a kitchen voice assistant and a robot. Voice services that can be provided by intelligent voice devices are also related to their application scenarios. For example, a vehicle-mounted information device may provide the functions, such as playing music, route inquiry, news broadcast, weather inquiry, reminder, and web search. A user demand that may be satisfied by an intelligent voice device may be set according to its specific application scenario. For example, a vehicle-mounted information device may meet the user demands, such as playing music, route inquiry, news broadcast, weather inquiry, reminder and web search. An optional operation that may be satisfied by an intelligent voice device and corresponds to each user demand may also be customized, and the optional operations are associated with the user demands that may be satisfied by the intelligent voice device. For example, customizable optional operations associated with the demand for playing music include: pause playing, continue to play, switch to the next, switch to the previous, add to favorites, thumb up, switch to single loop/list loop mode, and so on. These optional operations may be added to an optional operation set, and an associated relation between these optional operations and user demands is configured.

In the optional operation set, one optional operation may be associated with a plurality of user demands. For example, an operation of pausing playing may be associated with a music playing demand and a news broadcast demand. A correlation parameter between optional operations in the optional operation set and each user demand may also be further configured. The correlation parameter may be a parameter characterizing strength of the association between the optional operations and the user demands, and may be determined based on statistical analysis of historical demands and historical operations of a user.

Step 203, generating prompt information for guiding a user to execute the alternative operation.

In this embodiment, prompt information containing related information of an alternative operation may be generated to prompt a user to execute the alternative operation. Here, related information of the alternative operation may include the name and the operation object of the alternative operation, etc. The prompt information is used for guiding the user to execute the alternative operation, and the user may choose to, or not to, execute the alternative operation according to the guidance of the prompt information. The prompt information may be text prompt information or icon prompt information.

Step 204, pushing the prompt information to the intelligent voice device containing the display to enable the intelligent voice device to show the prompt information on the display.

After generating the prompt information, the electronic device for providing a voice service may send the prompt information to an intelligent voice device through network. The intelligent voice device may show the prompt information on the display after receiving the prompt information. Thus, the user may obtain the prompt information through the display of the intelligent voice device, thereby executing corresponding operations under the guidance of the prompt information.

The method for providing a voice service according to the embodiments of this disclosure analyzes, in response to receiving first voice request information sent by an intelligent voice device containing a display, the first voice request information to determine a user demand; determines an alternative operation associated with the user demand based on a configured optional operation set; generates prompt information for guiding a user to execute the alternative operation; and pushes the prompt information to the intelligent voice device containing the display to enable the intelligent voice device to show the prompt information on the display, thereby realizing a user demand based differential operation prompt, improving the speed of obtaining relevant operation information by a user, and contributing to improving the efficiency of the voice service.

Figure 3:
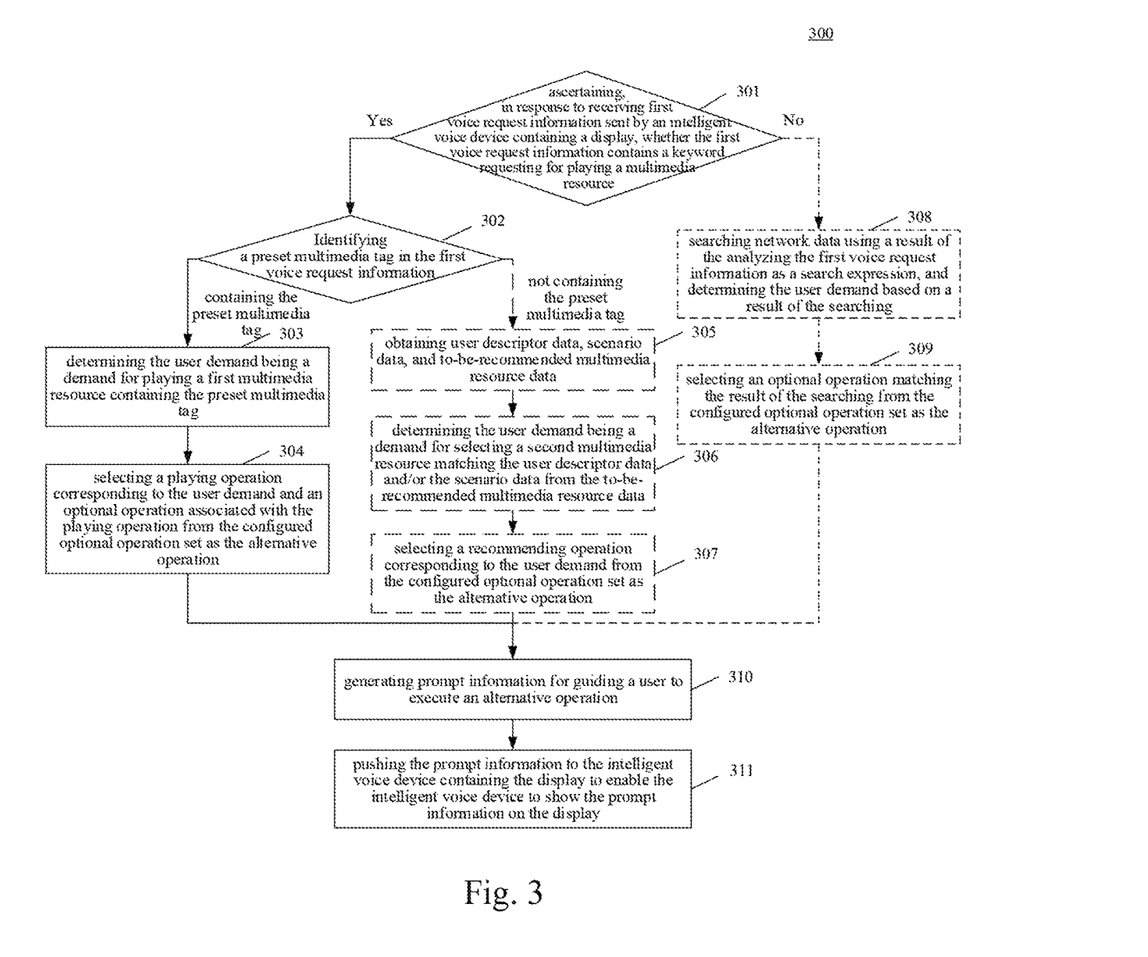
FIG. 3 is a schematic flowchart of a method for providing a voice service according to another embodiment of the present application.

Referring to FIG. 3, a schematic flowchart of another embodiment of a method for providing a voice service according to the disclosure is shown.

As shown in FIG. 3, in this embodiment, a process 300 of a method for providing a voice service may include:

Step 301, ascertaining, in response to receiving first voice request information sent by an intelligent voice device containing a display, whether the first voice request information contains a keyword requesting for playing a multimedia resource.

In this embodiment, the received first voice request information may be converted from voice to text. Content of the first voice request is converted to text, the text is lexed, and whether the result of the lexing contains a keyword requesting for playing a multimedia resource is ascertained. Here, the keyword requesting for playing a multimedia resource may be preset, may be a separate wording, such as "listen to music" and "listen to songs;" and may also be a combination of a plurality of wordings, such as a combination of "play" and "news," and a combination of "play some" and "music."

If a result of the ascertaining in the step 301 is "yes," step 302 will be executed, i.e., identifying a preset multimedia tag in the first voice request information.

If it is determined that the first voice request information includes a keyword requesting for playing a multimedia resource, then the user demand may be determined to be playing the multimedia resource. In this embodiment, characteristic attributes of the multimedia resource expected by a user to be played may be further determined based on the first voice request information, including an author, a type, a style, a language of the multimedia resource or an identifier for a set of the multimedia resources, etc. The specific modes of implementing the embodiment may be identifying the preset multimedia tag in the first voice request information. Here, the preset multimedia tag may be a tag for characterizing characteristic attributes of the multimedia resource, and the multimedia resource in a multimedia resource library may be configured with the tag.

For multimedia resources of music, for example, a music tag may include a tag for indicating a song name, a singer, a composer, an album name, a music type, a music style or a language, etc. of music, where the music type tag may, for example, include rock and roll, rap, folk, pop, bel canto or symphony, etc., the music style tag may include a cheerful, relaxed, sad or encouraging tag, etc., and the language tag may include mandarin Chinese, Cantonese, English, Korean or Japanese, etc.

In this embodiment, a multimedia tag set may be established based on tags of the multimedia resources in a multimedia resource library. A preset multimedia tag in the first voice request information may be identified by matching a multimedia tag set, and a successfully matched tag is an identified preset multimedia tag. Optionally, a multimedia tag may be matched using an exact matching method or a fuzzy matching method. The fuzzy matching may be choosing a tag similar to the first voice request information from the multimedia tags. For example, "Balixiang" in the first voice request information may be determined to successfully match a multimedia tag of "Qilixiang," so that a user demand may also be successfully identified when the user sends a fuzzy request.

If the first voice request information is identified to contain a preset multimedia tag, then step 303 will be executed, i.e., determining the user demand being a demand for playing a first multimedia resource containing the preset multimedia tag.

Here, if the first voice request information contains a tag matching a multimedia tag set, then it is determined that the user expects to play a multimedia resource having the tag, thus realizing accurate identification of a user demand.

Then, in step 304, a playing operation corresponding to a user demand and an optional operation associated with the playing operation are selected from a configured optional operation set as alternative operations.

After a user demand is determined to be a demand for playing a multimedia resource having a preset multimedia tag, a playing operation satisfying the user demand and an associated optional operation that may be required to be executed by the user in the playing operation may be selected from a configured optional operation set as alternative operations. Here, the optional operation associated with the playing operation includes at least one of the following operations: an operation of selecting a to-be-played multimedia resource, an operation of switching a play mode, and an operation of feeding back preferences for a played multimedia resource. The operation of selecting a to-be-played multimedia resource may be an operation of switching a currently played resource, such as selecting "the next;" the operation of switching a play mode may be an operation of selecting a mode, such as "single loop," "list loop," or "shuffle play;" and the operation of feeding back preferences for a played multimedia resource may be, for example, an operation of selecting "like this song," "add this song to favorites" or "dislike this song."

In some embodiments, the developer of the intelligent voice device may configure a plurality of optional operations associated with a playing operation for a multimedia resource playing function of the intelligent voice device. Then, when a user demand is determined to be a demand for playing a first multimedia resource containing the preset multimedia tag, the optional operations configured by the developer and associated with the playing operation may be used as alternative operations. Thus, after subsequently generated prompt information for guiding a user to execute an alternative operation is pushed to a display of the intelligent voice device, the user may be aware of optional operations associated with the playing operation of the intelligent voice device, thereby enabling the user to understand the service ability of the intelligent voice device, and helping the user to obtain an more abundant and efficient intelligent voice service.

Then, in step 310, prompt information for guiding a user to execute an alternative operation is generated, and then, in step 311, the prompt information is pushed to an intelligent voice device containing the display to enable the intelligent voice device to show the prompt information on the display.

Step 310 and step 311 are the same as the steps 203 and 204 in the foregoing embodiments, and are not repeated any more here.

By identifying a keyword requesting for playing a multimedia resource in first voice request information and a preset multimedia tag, characteristic attributes of the multimedia resource expected by a user to be played can be accurately identified to determine the user demand being a demand for playing the multimedia resource containing the preset multimedia tag, thereby determining a playing operation and an optional operation associated with the playing operation being operations that may be expected by the user to be executed in the playing process and pushing prompt information of these operations that may be expected to be executed to the user. The prompt information of the operations matching the user demand can be accurately pushed, thereby saving the time of searching for relevant operation functions for the user, and contributing to improving the efficiency of the voice service.

Figure 4:
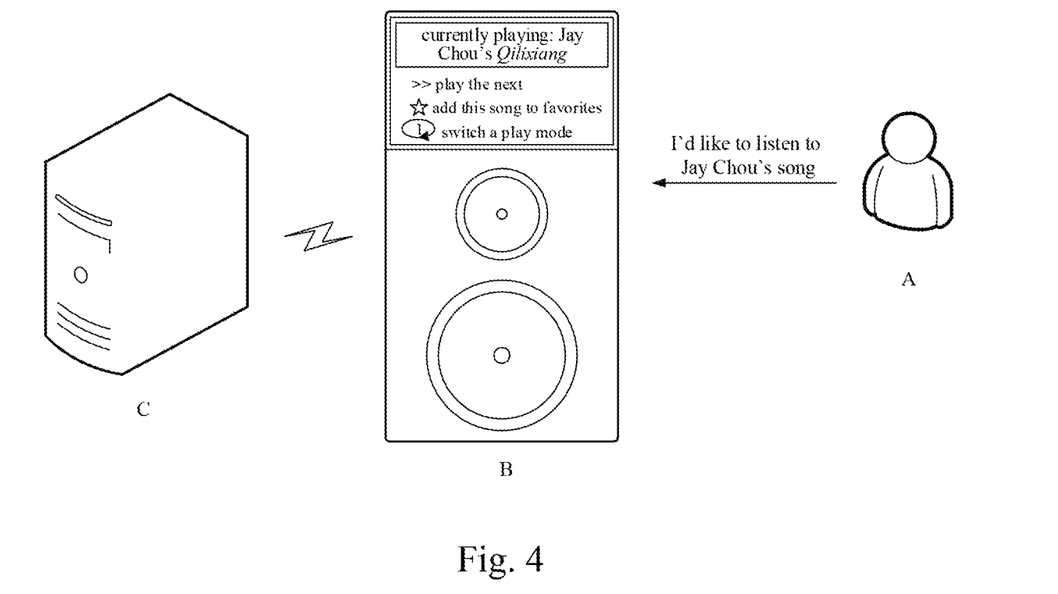
FIG. 4 is a schematic flowchart of an application scenario of the method for providing a voice service according to an embodiment of the present application.
Figure 5:
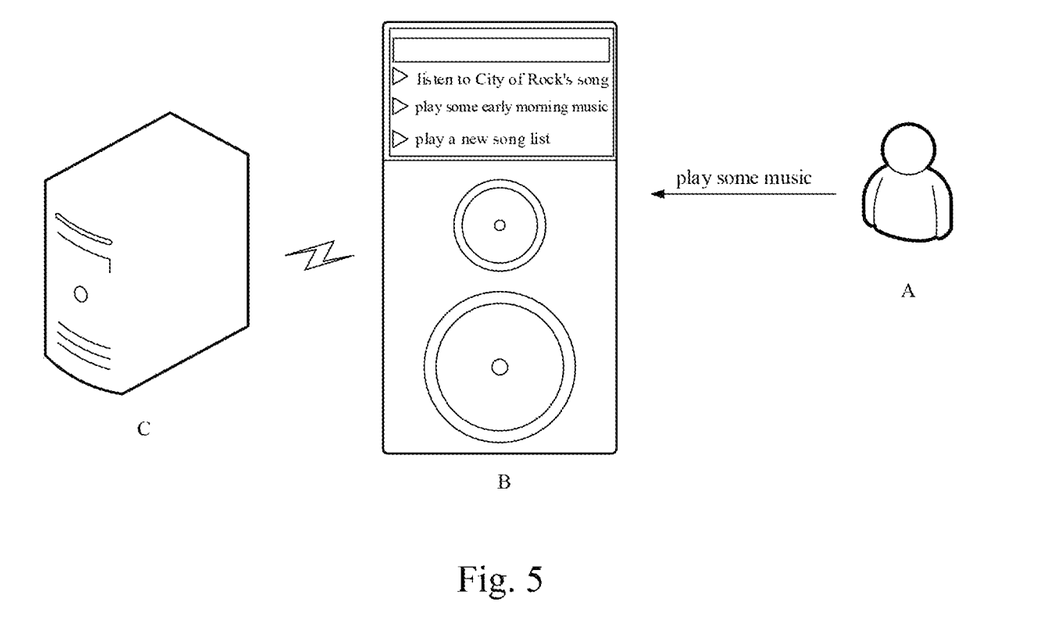
FIG. 5 is a schematic flowchart of a further application scenario of the method for providing a voice service according to an embodiment of the present application 8.

Referring to FIG. 4, a schematic diagram of an application scenario of a method for providing a voice service according to the disclosure is shown. As shown in FIG. 4, after a user A sends a request "I'd like to listen to Jay Chou's songs" to an intelligent voice device B having a display, the intelligent voice device B sends the request to a voice server C, which may extract a combination of keywords "listen to" and "song" therein, determine the user demand being a demand for playing a song, and identify a tag of the song "Jay Chou". Then the user demand may be further determined to be a demand for playing Jay Chou's song. Then a playing operation and optional operations associated with the playing operation, such as "play the next," "add this song to favorites" and "switch a play mode," may be determined to be alternative operations, and prompt information of the alternative operations is generated and pushed to the intelligent voice device B, which may show the user A the prompt information containing the alternative operations on the display.

In some embodiments, after the step 302, if the first voice request information is identified not containing a preset multimedia tag, then in response to determining the first voice request information containing a keyword requesting for playing the multimedia resource and the first voice request information not containing a preset multimedia tag, step 305 will be executed, i.e., obtaining user descriptor data, scenario data and to-be-recommended multimedia resource data.

If a user demand is determined to be a demand requesting for playing a multimedia resource based on a result of the ascertaining in the step 301, but the user is determined not to have a specific demand for expecting to play the multimedia resource based on the result of the identifying in the step 302, then the user demand corresponding to the first voice request information may be determined to be an multimedia resource of extensive demand, i.e., the user expects an intelligent device to select and play some multimedia resources. Under the circumstance, user descriptor data, scenario data and to-be-recommended multimedia resource data may be obtained to select the multimedia resources to be played based on the obtained data. The user descriptor data may include the time and frequency of using a multimedia resource playing function of an intelligent voice device by a user, basic attributes of the user (including gender, character, career, etc.), historical multimedia resource playing records of the user, etc. The scenario data may include the current time and environmental data. The environmental data may be determined based on the geographic location information, and may also be determined based on the detected environmental sound. The scenario data may include, e.g., early morning, evening, night, a living room, an office, etc. The to-be-recommended multimedia resource data may be newly published multimedia resources (e.g., new albums), and multimedia resources with high popularity in network.

Then, step 306, determining the user demand being a demand for selecting a second multimedia resource matching the user descriptor data and/or the scenario data from the to-be-recommended multimedia resource data.

The user demand may be determined to be a demand for recommending and playing some multimedia resources that may be favored. Specifically, a multimedia resource may be selected from the to-be-recommended multimedia resources based on the user descriptor data and/or the scenario data, and then be recommended.

Optionally, the second multimedia resource matching the user descriptor data may be selected from the to-be-recommended multimedia resource data as a recommended object. Here, the to-be-recommended multimedia resource may have a tag for indicating its characteristic attributes. A similarity between the user descriptor data and the tag of the to-be-recommended multimedia resource may be calculated, and if the similarity is greater than a threshold value, then the matching is successful. Optionally, the similarity may also be weighted using popularity data of the multimedia resource. The higher the popularity is, the higher the weight is. The popularity data may be calculated based on the publication time, views, search volume and the like of the multimedia resource.

Optionally, the second multimedia resource matching the scenario data may be selected from the to-be-recommended multimedia resource data as a recommended object. The scenario data may be the current time and environmental data. Views and search volume of the to-be-recommended multimedia resource in each period and each environment may be collected, and the to-be-recommended multimedia resource with highest views and/or search volume in the period of the current time is selected as a recommended object. For example, if the current time is 8:00 a.m., then fresh and cheerful music with highest views in the early morning may be selected as a recommended to-be-played object.

Optionally, the second multimedia resource as a recommended object may be determined based on the user descriptor data and the scenario data. A comprehensive similarity between the to-be-recommended multimedia resource and the user descriptor data and between the to-be-recommended multimedia resource and the scenario data may be calculated by weighted sum of a similarity between the to-be-recommend multimedia resource and the user descriptor data and an association degree between the to-be-recommend multimedia resource and the scenario data. Then the to-be-recommended multimedia resource with a high comprehensive similarity is determined to be the selected second multimedia resource.

Then, in step 307, a recommending operation corresponding to the user demand is selected from a configured optional operation set as an alternative operation.

In this embodiment, a corresponding relation between the optional operations and the user demands may be configured in the configured optional operation set, where an optional operation corresponding to a demand for selecting a recommended object from to-be-recommend multimedia resource data is used as a recommending operation. Thus, the electronic device for providing a voice service may determine an alternative operation associated with the user demand obtained in step 306 to be a recommending operation based on the corresponding relation. Furthermore, a recommended object of the recommending operation may be determined to include the second multimedia resource. Then, when prompt information is subsequently generated, prompt information guiding a user to execute the selected and recommended second multimedia resource may be generated. Optionally, the prompt information guiding a user to execute the selected and recommended second multimedia resource may be prompt information guiding the user to send a further voice request, thus guiding the user, through the prompt information, to execute a plurality of rounds of dialogue with the intelligent voice device, and more accurately determining the user demand.

After the step 307, the step 310 and the step 311 may be executed. The step 310 and the step 311 are consistent with the step 203 and the step 204 in the foregoing embodiments, and are not repeated any more here.

Figure 8:
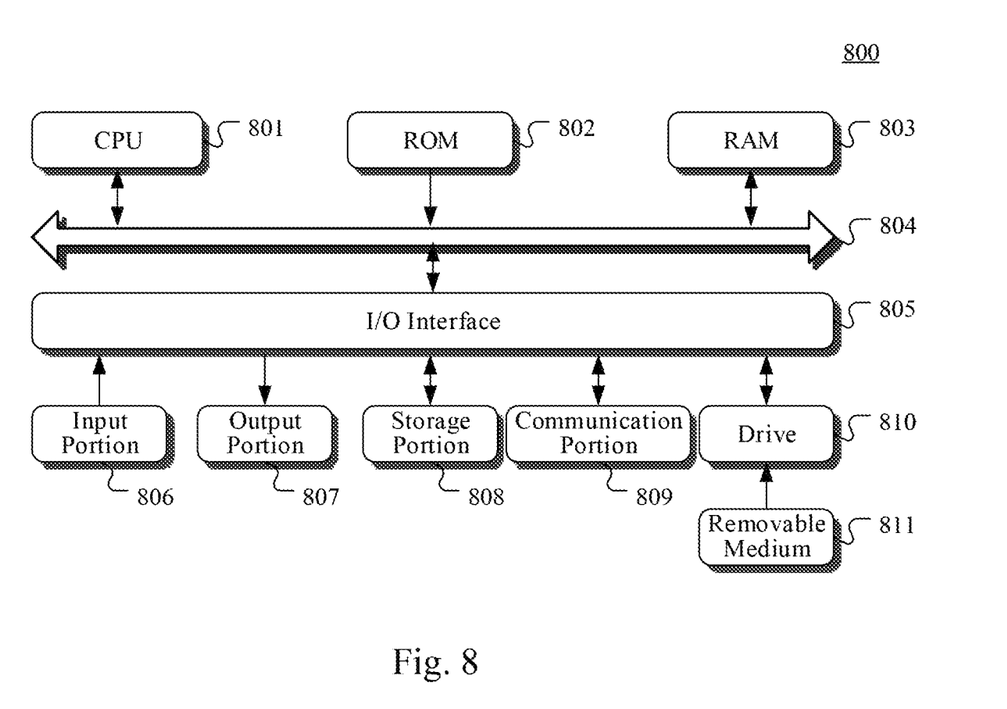
FIG. 8 is a structural schematic diagram of a computer system of a server adapted to implement a server of the embodiments of the present application.

Referring to FIG. 8, a schematic diagram of an application scenario of a method for providing a voice service according to the disclosure is shown. As shown in FIG. 8, after a user A sends a request "play some music" to an intelligent voice device B having a display, the intelligent voice device B sends the request to a voice server C. The voice server C may extract a combination of keywords "play"+"music," and determine the user demand being a demand for playing a song. The intelligent voice server fails to identify any tag for indicating song characteristics, then the user demand may be further determined to be a demand for recommending a song, early morning music matching the current scenario, recently popular City of Rock's song consistent with a favourite style of the user or a song in a new song list may be selected as a song recommended to the user, and prompt information guiding the user to play the recommended song is generated. Then the prompt information is pushed to the intelligent voice device B, which may show the user A the corresponding prompt information "listen to City of Rock's song," "play some early morning music" and "play a new song list," on the display. Such prompt information may be used as user guidance for the next round of dialogue. Upon seeing the prompt information, the user A may send a request, such as "I wouldn't like a new song list" or "play some early morning music." Under the circumstance, the voice server C may further revise the user demand analysis structure based on the request sent by the user, and adjust prompt information of the provided optional operations.

In some embodiments, if the result of the ascertaining in the step 301 is "no," i.e., in response to determining the first voice request information not containing a keyword requesting for playing a multimedia resource, step 308 may be executed, i.e., searching network data using a result of the analyzing the first voice request information as a search expression, and determining the user demand based on a result of the searching.

In this embodiment, the first voice request may be analyzed, and a search expression is generated based on a result of the analyzing the first voice request, network data is searched using a search expression, and then a result of the searching is analyzed to determine a user demand.

In some optional modes of implementing this embodiment, a plurality of results of the searching may be analyzed using a demand identification model to determine a user demand. In other optional modes of implementing this embodiment, some operation options may be extracted from a page of the result of the searching as a user demand analysis result. For example, when the page of the result of the searching includes "route inquiry," "reminder" or other operation options, the user demand may be determined to be inquiring a route or establishing a reminder item.

Furthermore, data of an operation executed by other users after searching using a similar search expression in network may be obtained, and statistical analysis of the data of the operation executed by other users is implemented to determine operations that may be executed by a sender after sending first voice request information and a probability of executing the operation. For example, most users in network executed an operation of booking tickets after searching "Eason Chan's Concert," then when the first voice request information includes "Concert," a user may be determined to have a high probability of executing the operation of booking tickets, and the user demand is further determined to include a demand for booking tickets.

Step 309, selecting an optional operation matching a result of the searching from a configured optional operation set as an alternative operation.

Operations that may be executed by an intelligent voice device may be configured in a configured optional operation set. After searching based on a result of analyzing first voice request information, and determining a user demand based on a result of the searching, an optional operation matching the result of the searching may be selected from the configured optional operation set as the alternative operation. Specific matching mode may be matching between operation name of the optional operation and the result of the searching, or calculating a similarity between the operation name of the optional operation and operation data extracted from the result of the searching.

After the step 309, the step 310 and the step 311 may be executed. The step 310 and the step 311 are consistent with the step 203 and the step 204 in the foregoing embodiments, and are not repeated any more here.

Figure 6:
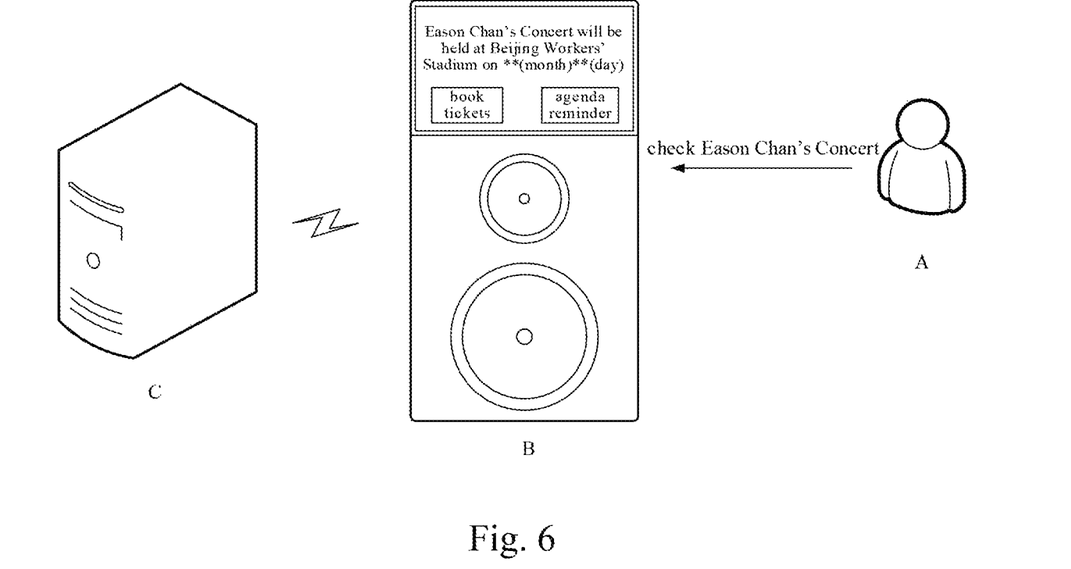
FIG. 6 is a schematic flowchart of a further application scenario of the method for providing a voice service according to an embodiment of the present application.

Referring to FIG. 6, a schematic diagram of an application scenario of a method for providing a voice service according to the disclosure is shown. As shown in FIG. 6, after a user A sends a request "check Eason Chan's Concert" to an intelligent voice device B having a display, the intelligent voice device B sends the request to a voice server C. The voice server C may analyze the request, determine the request not containing a keyword for playing a multimedia resource, further search using "check Eason Chan's Concert" as a search expression, extract an operation of "book tickets" and an operation of "agenda reminder" on a page of the result of the searching, and determine the user demand being "book tickets" or "agenda reminder." Then the voice server C may ascertain whether the operation of "book tickets" and the operation of "agenda reminder" are included in a configured optional operation set, may generate, if a result of the ascertaining is "yes," prompt information guiding the user to execute the operation of "book tickets" and the operation of "agenda reminder," and push the prompt information to the intelligent voice device B. The intelligent voice device B may show the user A corresponding prompt information of "book tickets" and "agenda reminder" on the display.

By searching network data using the first voice request information, network-sourced big data may be used to improve user demand identification accuracy, and may provide relevant user operation behavior data. Alternative operations may be selected based on these operation behavior data to prompt a user to execute these alternative operations, thereby realizing diversified user demand identifications and operation prompts.

In some optional modes of implementing this embodiment, the analyzing the first voice request information to determine a user demand may include: obtaining second voice request information being received in a preset period before receiving the first voice request information; and analyzing the first voice request information based on the second voice request information to determine the user demand. Here, the preset period may be an artificially set period, such as 5 minutes. Under the circumstance, the electronic device for providing a voice service may further accurately determine the user demand based on a plurality of rounds of dialogue between an intelligent device and a user. Specifically, when the first voice request information is analyzed, the received second voice request information may be used as an additional condition, an analysis result satisfying the additional condition is selected from a result of the analyzing the first voice request information, and then the user demand is determined. Or, the first voice request information and the second voice request may be combined and analyzed simultaneously. For example, the first voice request information and the second voice request information may be combined into one piece of voice request information, which is inputted into a machine learning based user demand identification model to identify the user demand. Thus, a plurality of pieces of voice request information received in a relatively short time may be combined to analyze the user demand, thereby enhancing the accuracy of user demand analysis results, and improving the pertinence of the voice service.

In some optional modes of implementing this embodiment, the method for providing a voice service may further include: monitoring user behavior data of executing an alternative operation based on the prompt information; and adjusting a parameter of a correlation between the alternative operation in a configured optional operation set and the user demand based on the behavior data.

Specifically, the intelligent voice device may record whether a user executes an alternative operation prompted by prompt information, and the number of times and frequency of executing each alternative operation, and report the data to an electronic device for providing a voice service. The electronic device for providing a voice service may adjust the parameter of a correlation between the alternative operations and the user demands.

In a practical scenario, if a user fails to execute a corresponding alternative operation or executes the alternative operation a few times after seeing prompt information, then the user may be considered to be less interested in the alternative operation. Under the circumstance, the parameter of a correlation between the user demand and the alternative operation determined in the step 201 may be reduced, and the correlation between the user demand and the alternative operation is weakened to reduce the probability of promoting to execute the alternative operation and decrease the occurrence of the prompt information of the alternative operation under a given user demand later. On the contrary, if a user frequently executes an alternative operation after seeing prompt information, then the user may be considered to be more interested in the alternative operation, or the alternative operation provides the user with strong assistance. Under the circumstance, the parameter of a correlation between the user demand and the alternative operation determined in the step 201 may be enhanced, and the correlation between the user demand and the alternative operation is strengthened to increase the probability of prompting the user to execute the alternative operation and intensify the occurrence of the prompt information of the alternative operation under a given user demand later. Therefore, the correlation between optional operations in the optional operation set and the user demands may be dynamically updated by collecting the user's operation behavior data, to further enhance the matching rate between the generated prompt information and the user demand.

Figure 7:
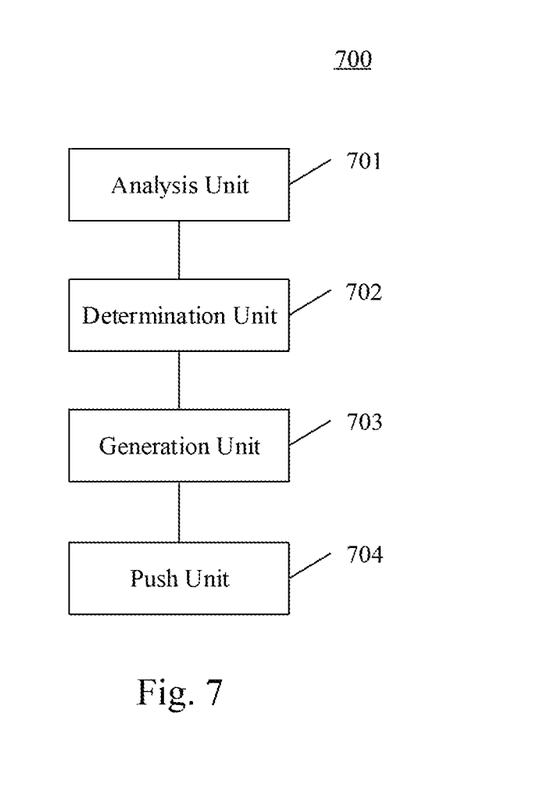
FIG. 7 is a structural schematic diagram of an apparatus for providing a voice service according to an embodiment of the present application.

Further referring to FIG. 7, as implementation of the methods shown in the figures, the disclosure provides an embodiment of an apparatus for providing a voice service, the embodiment of the apparatus corresponds to the embodiments of the methods shown in FIG. 2 and in FIG. 3, and the apparatus may be specifically applied in a variety of electronic devices.

As shown in FIG. 7, an apparatus for providing a voice service 700 according to this embodiment includes: an analysis unit 701, a determination unit 702, a generation unit 703 and a push unit 704, where the analysis unit 701 is used for analyzing, in response to receiving first voice request information sent by an intelligent voice device containing a display, the first voice request information to determine a user demand; the determination unit 702 is used for determining an alternative operation associated with the user demand based on a configured optional operation set; the generation unit 703 is used for generating prompt information for guiding a user to execute the alternative operation; and the push unit 704 is used for pushing the prompt information to the intelligent voice device containing the display to enable the intelligent voice device to show the prompt information on the display.

In this embodiment, the analysis unit 701 may decode, after detecting receipt of first voice request information sent by an intelligent voice device containing a display, the first voice request information to obtain the voice request content, and then implement semantic analysis of the voice request content by firstly lexing using a language model, then extracting core words and keywords, and finally determining the user demand included in the voice request content using a topic model.

The determination unit 702 may select an optional operation associated with a user demand obtained by the analysis unit 701 through analysis from an optional operation set configured with a user demand associated with each optional operation as an alternative operation.

The generation unit 703 may generate prompt information including relevant information of an alternative operation determined by the generation unit 703, to prompt a user to execute the alternative operation. Here, the relevant information of the alternative operation may include the name and operation objects of the alternative operation, etc.

The push unit 704 may push prompt information generated by the generation unit 703 to an intelligent voice device sending first voice request information and containing the display through network. The intelligent voice device may show the prompt information on the display, to guide the user to execute a corresponding operation based on the prompt information.

In some embodiments, the analysis unit 701 may be further used for analyzing first voice request information to determine a user demand as follows: ascertaining whether the first voice request information contains a keyword requesting for playing a multimedia resource; and if yes, identifying a preset multimedia tag in the first voice request information, and determining the user demand being a demand for playing a first multimedia resource containing the preset multimedia tag. The determination unit 702 may be further used for determining an alternative operation associated with the user demand as follows: selecting a playing operation corresponding to the user demand and an optional operation associated with the playing operation from a configured optional operation set as the alternative operation; the optional operation associated with the playing operation including at least one of the following operations: an operation of selecting a to-be-played multimedia resource, an operation of switching a play mode, and an operation of feeding back preferences for a played multimedia resource.

In some embodiments, the analysis unit 701 may be further used for analyzing first voice request information to determine a user demand as follows: obtaining user descriptor data, scenario data and to-be-recommended multimedia resource data in response to determining the first voice request information containing a keyword requesting for playing the multimedia resource and the first voice request information not containing a preset multimedia tag; and determining the user demand being a demand for selecting a second multimedia resource matching the user descriptor data and/or the scenario data from the to-be-recommended multimedia resource data. Under the circumstance, the determination unit 702 may be further used for determining an alternative operation associated with the user demand as follows: selecting a recommending operation corresponding to the user demand from a configured optional operation set as the alternative operation, wherein a recommended object of the recommending operation includes the second multimedia resource.

In some embodiments, the analysis unit 701 may be further used for analyzing the first voice request information to determine a user demand as follows: searching, in response to determining the first voice request information not containing a keyword requesting for playing a multimedia resource, network data using a result of the analyzing the first voice request information as a search expression, and determining the user demand based on a result of the searching. Under the circumstance, the determination unit 702 may be further used for determining an alternative operation associated with the user demand as follows: selecting an optional operation matching the result of the searching from a configured optional operation set as the alternative operation.

In some embodiments, the analysis unit 701 may be further used for analyzing first voice request information to determine a user demand as follows: obtaining second voice request information being received in a preset period before receiving the first voice request information; and analyzing the first voice request information based on the second voice request information to determine the user demand.

In some embodiments, the apparatus 700 may further include a feedback unit for: monitoring user behavior data of executing an alternative operation based on prompt information; and adjusting a parameter of a correlation between the alternative operation in a configured optional operation set and a user demand based on the behavior data.

It should be understood that the units recorded in the apparatus 700 correspond to the steps in the methods described in FIG. 2 and FIG. 3. Thus, the foregoing operations and characteristics described for the methods are also applicable to the apparatus 700 and units included therein, and are not repeated any more here.

The apparatus 700 for providing a voice service according to the embodiments of this disclosure analyzes, by an analysis unit in response to receiving first voice request information sent by an intelligent voice device containing a display, the first voice request information to determine a user demand; determines, by a determination unit, an alternative operation associated with the user demand based on a configured optional operation set; generates, by a generation unit, prompt information for guiding a user to execute the alternative operation, and pushes, by a push unit, the prompt information to the intelligent voice device containing the display to enable the intelligent voice device to show the prompt information on the display, thereby realizing a user demand based differential operation prompt, providing different operation prompt information for different potential user demands, improving the speed of obtaining relevant operation information by a user, and contributing to improving the efficiency of the voice service.

Below referring to FIG. 8, a structural diagram of a computer system 800 of a server applicable for implementing embodiments of the disclosure is shown. The server shown in FIG. 8 is only an example, and shall not limit the functions and serviceable range of embodiments of the disclosure in any way.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 comprising a cathode ray tube (CRT), a liquid crystal display device (LCD), a speaker etc.; a storage portion 808 including a hard disk and the like; and a communication portion 809 comprising a network interface card, such as a LAN card and a modem. The communication portion 809 performs communication processes via a network, such as the Internet. A drive 810 is also connected to the I/O interface 805 as required. A removable medium 811, such as a magnetic disk, an optical disk, a magneto-optical disk, and a semiconductor memory, may be installed on the drive 810, to facilitate the retrieval of a computer program from the removable medium 811, and the installation thereof on the storage portion 808 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 809, and/or may be installed from the removable media 811. The computer program, when executed by the central processing unit (CPU) 801, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an analysis unit, a determination unit, a generation unit, and a push unit, where the names of these units or modules do not in some cases constitute a limitation to such units or modules themselves. For example, the analysis unit may also be described as "a unit for analyzing, in response to receiving first voice request information sent by an intelligent voice device containing a display, the first voice request information."

In another aspect, the present application further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: analyze, in response to receiving first voice request information sent by an intelligent voice device containing a display, the first voice request information to determine a user demand; determine an alternative operation associated with the user demand based on a configured optional operation set; generate prompt information for guiding a user to execute the alternative operation; and push the prompt information to the intelligent voice device containing the display to enable the intelligent voice device to show the prompt information on the display.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for providing a voice service, the method comprising:
    analyzing, in response to receiving first voice request information sent by an intelligent voice device containing a display, the first voice request information to determine a user demand;
    determining an alternative operation associated with the user demand based on a configured optional operation set;
    generating prompt information for guiding a user to execute the alternative operation; and
    pushing the prompt information to the intelligent voice device containing the display to enable the intelligent voice device to show the prompt information on the display,
    wherein the analyzing the first voice request information to determine a user demand comprises:
        ascertaining whether the first voice request information contains a keyword requesting for playing a multimedia resource; and
        in response to the first voice request information containing the keyword, identifying a preset multimedia tag in the first voice request information, and determining the user demand being a demand for playing a first multimedia resource containing the preset multimedia tag; and
    wherein the determining an alternative operation associated with the user demand based on a configured optional operation set comprises:
        selecting a playing operation corresponding to the user demand and an optional operation associated with the playing operation from the configured optional operation set as the alternative operation.

2. The method according to claim 1, wherein the optional operation associated with the playing operation comprising at least one of the following operations: an operation of selecting a to-be-played multimedia resource, an operation of switching a play mode, or an operation of feeding back a preference for a played multimedia resource.

3. The method according to claim 1, wherein the analyzing the first voice request information to determine a user demand further comprises:
    obtaining user descriptor data, scenario data, and to-be-recommended multimedia resource data in response to determining the first voice request information containing a keyword requesting for playing the multimedia resource and the first voice request information not containing a preset multimedia tag; and
    determining the user demand being a demand for selecting a second multimedia resource matching the user descriptor data and/or the scenario data from the to-be-recommended multimedia resource data; and
    wherein the determining an alternative operation associated with the user demand based on a configured optional operation set comprises:
        selecting a recommending operation corresponding to the user demand from the configured optional operation set as the alternative operation, wherein a recommended object of the recommending operation comprises the second multimedia resource.

4. The method according to claim 1, wherein the analyzing the first voice request information to determine a user demand further comprises:
    searching, in response to determining the first voice request information not containing a keyword requesting for playing a multimedia resource, network data using a result of the analyzing the first voice request information as a search expression, and determining the user demand based on a result of the searching; and
    wherein the determining an alternative operation associated with the user demand based on a configured optional operation set comprises:
        selecting an optional operation matching the result of the searching from the configured optional operation set as the alternative operation.

5. The method according to claim 1, wherein the analyzing the first voice request information to determine a user demand comprises:
    obtaining second voice request information being received in a preset period before receiving the first voice request information; and
    analyzing the first voice request information based on the second voice request information to determine the user demand.

6. The method according to claim 1, wherein the method further comprises:
    monitoring user behavior data of executing the alternative operation based on the prompt information; and
    adjusting a parameter of a correlation between the alternative operation in the configured optional operation set and the user demand based on the behavior data.

7. An apparatus for providing a voice service, the apparatus comprising:
    at least one processor; and
    a memory storing instructions, the instructions when executed by the at least one processor, cause the at least one processor to perform operations, the operations comprising:
    analyzing, in response to receiving first voice request information sent by an intelligent voice device containing a display, the first voice request information to determine a user demand;
    determining an alternative operation associated with the user demand based on a configured optional operation set;
    generating prompt information for guiding a user to execute the alternative operation; and
    pushing the prompt information to the intelligent voice device containing the display to enable the intelligent voice device to show the prompt information on the display,
    wherein the analyzing the first voice request information to determine a user demand comprises:
        ascertaining whether the first voice request information contains a keyword requesting for playing a multimedia resource; and
        in response to the first voice request information containing the keyword, identifying a preset multimedia tag in the first voice request information, and determining the user demand being a demand for playing a first multimedia resource containing the preset multimedia tag; and wherein the determining an alternative operation associated with the user demand based on a configured optional operation set comprises:
selecting a playing operation corresponding to the user demand and an optional operation associated with the playing operation from the configured optional operation set as the alternative operation.

8. The apparatus according to claim 7, wherein
the optional operation associated with the playing operation comprising at least one of the following operations: an operation of selecting a to-be-played multimedia resource, an operation of switching a play mode, or an operation of feeding back a preference for a played multimedia resource.

9. The apparatus according to claim 7, wherein the analyzing the first voice request information to determine a user demand further comprises:
obtaining user descriptor data, scenario data and to-be-recommended multimedia resource data in response to determining the first voice request information containing a keyword requesting for playing the multimedia resource and the first voice request information not containing a preset multimedia tag; and
determining the user demand being a demand for selecting a second multimedia resource matching the user descriptor data and/or the scenario data from the to-be-recommended multimedia resource data; and
wherein the determining an alternative operation associated with the user demand based on a configured optional operation set comprises:
selecting a recommending operation corresponding to the user demand from a configured optional operation set as the alternative operation, wherein a recommended object of the recommending operation comprises the second multimedia resource.

10. The apparatus according to claim 7, wherein the analyzing the first voice request information to determine a user demand further comprises:
searching, in response to determining the first voice request information not containing a keyword requesting for playing a multimedia resource, network data using a result of the analyzing the first voice request information as a search expression, and determining the user demand based on a result of the searching; and
wherein the determining an alternative operation associated with the user demand based on a configured optional operation set comprises:
selecting an optional operation matching the result of the searching from the configured optional operation set as the alternative operation.

11. The apparatus according to claim 7, wherein the analyzing the first voice request information to determine a user demand comprises:
obtaining second voice request information being received in a preset period before receiving the first voice request information; and
analyzing the first voice request information based on the second voice request information to determine the user demand.

12. The apparatus according to claim 7, wherein the operations further comprise:
monitoring user behavior data of executing the alternative operation based on the prompt information; and
adjusting a parameter of a correlation between the alternative operation in the configured optional operation set and the user demand based on the behavior data.

13. A non-transitory computer storage medium storing a computer program, the computer program when executed by one or more processors, causes the one or more processors to perform operations, the operations comprising:
analyzing, in response to receiving first voice request information sent by an intelligent voice device containing a display, the first voice request information to determine a user demand;
determining an alternative operation associated with the user demand based on a configured optional operation set;
generating prompt information for guiding a user to execute the alternative operation; and
pushing the prompt information to the intelligent voice device containing the display to enable the intelligent voice device to show the prompt information on the display,
wherein the analyzing the first voice request information to determine a user demand comprises:
ascertaining whether the first voice request information contains a keyword requesting for playing a multimedia resource; and
in response to the first voice request information containing the keyword, identifying a preset multimedia tag in the first voice request information, and determining the user demand being a demand for playing a first multimedia resource containing the preset multimedia tag; and
wherein the determining an alternative operation associated with the user demand based on a configured optional operation set comprises:
selecting a playing operation corresponding to the user demand and an optional operation associated with the playing operation from the configured optional operation set as the alternative operation.

* * * * *